O. SUNDBY.
TIRE SPREADER.
APPLICATION FILED FEB. 5, 1921.

1,380,436.

Patented June 7, 1921.
2 SHEETS—SHEET 1.

Inventor
Olaf Sundby
By his Attorneys
Merchant Kilgore & Kilgore

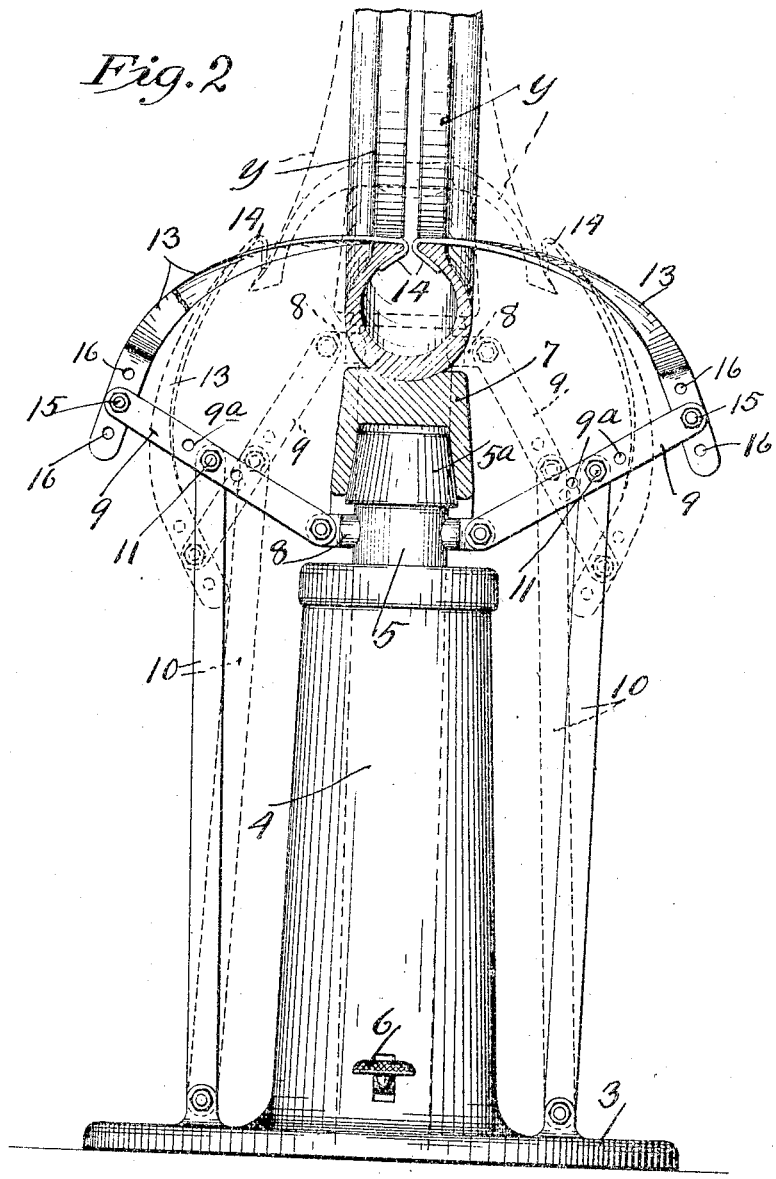

UNITED STATES PATENT OFFICE.

OLAF SUNDBY, OF EAST ELLSWORTH, WISCONSIN, ASSIGNOR TO SUNDBY & HARRIS, OF EAST ELLSWORTH, WISCONSIN, A COPARTNERSHIP COMPOSED OF OLAF SUNDBY AND GEORGE HARRIS.

TIRE-SPREADER.

1,380,436.

Specification of Letters Patent. Patented June 7, 1921.

Application filed February 5, 1921. Serial No. 442,889.

*To all whom it may concern:*

Be it known that I, OLAF SUNDBY, a citizen of the United States, residing at East Ellsworth, in the county of Pierce and State of Wisconsin, have invented certain new and useful Improvements in Tire-Spreaders; and I do hereby declare the following to be a full, clear, and exact description of the invention, such as will enable others skilled in the art to which it appertains to make and use the same.

My invention provides an improved tire spreader adapted to open up and turn inside out the engaged portions of the casings of pneumatic tires, so as to thereby facilitate the making of repairs in the casing.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is a view partly in elevation and partly in section on the line 2—2 of Fig. 1.

Figure 1:
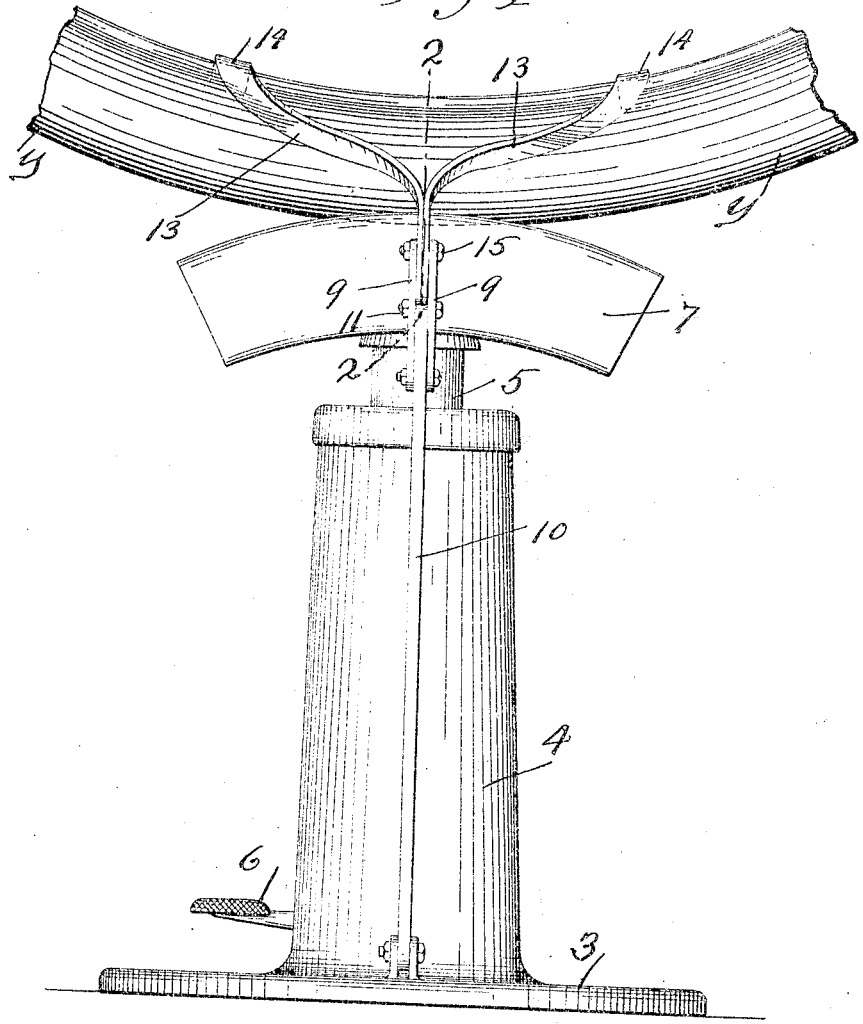
Figure 1 is a side elevation showing the improved spreader.

An ordinary tire casing is indicated by the character *y*. The numeral 3 indicates a base or floor plate provided with an upstanding cylinder 4 in which works a piston 5. The cylinder and piston 5 constitute a reciprocating hydraulic motor such as used, for example, in raising and lowering barber chairs and wherein the valve mechanism, which controls the flow of oil to and from the cylinder, is regulated by a foot lever 6.

The upper end of the piston 5, as shown, is tapered at 5ª to fit a tapered seat in an arched or convexly curved platen 7 on which the tire casing *y* is directly placed with its convex surface curving reversely to the curve of said platen. Preferably, the platen 7 is slightly recessed on top to receive a portion of the tire casing.

Below its tapered upper end 5ª, the piston 5 has outstanding lugs 8, to which the inner ends of a pair of oppositely projecting levers 9 are pivotally attached. So-called fulcrum links 10 are pivoted at their lower ends to the base 3 and at their upper ends are pivoted to the intermediate portions of the respective levers 9, as shown, by nut-equipped bolts 11 that may be passed through any one of several perforations 9ª in said levers.

For each lever 9 there is a pair of grapple arms 13 formed with hook-like rim-engaging ends 14. The grapple arms 13, at the same side of the device, have their outer ends brought together and preferably secured together and pivotally connected to the outer ends of the levers 9 by nut-equipped bolts 15 passed through any one of several perforations 16 in the connected ends of said arms.

The arms 13 have considerable spread in a direction circumferentially of the tire casing, so that they will open up a considerable portion of the tire casing at one operation. As preferably designed, each lever 9 comprises a pair of laterally spaced metal strips, between which the upper ends of the links 10 and the connected ends of the arms 13 are placed, (see Fig. 1.).

*Operation.*

When the tire casing is to be opened up, it is placed on the platen 7, as shown in the drawings, the hook ends of the grapple arms 13 are engaged with the flanges of the casing, as shown by full lines in Fig. 2, and then, by stepping on the foot lever 6, the piston 5 is caused to rise to the desired extent, carrying with it the platen to or substantially to the position shown by dotted lines in Fig. 2. By reference to said Fig. 2, it will be noted that the rising movement of the platen causes the levers 9 to move on the fulcrum links 10 and to spread as the casing is opened up and to thereby cause the upwardly pressed portion of the casing to turn inside out, as also indicated by dotted lines in Fig. 2. In fact, when the tire casing is bulged in cross section, as shown by dotted lines in Fig. 2, and is pressed upwardly and inwardly by the curved platen 7, it will, when it reaches the position shown in Fig. 2, maintain that position so that when removed from the spreader, it may be carried to a polisher or elsewhere and operated upon for the purpose of making repairs or the like.

The links 10, it will be noted, simply afford movable or floating fulcrums for the levers 9. The extent to which the grapple arms 13 will move under a predetermined piston movement may be varied by placing the bolts 11 in different holes 9ª. The normal spread of the grapple arms 13 may be varied by placing the bolts 15 in different holes 16. For tires that vary greatly in diameter, this platen 7, having different curvature, may be employed and the one may be readily substituted for the other on the tapered end of the piston. It should be noted that when the device operates as described to turn the tire casing inside out or to open the same up, the hook end 14 of the grapple arms, and hence the edges of the casing, do not move vertically to any considerable extent but are simply opened up by approximately horizontal separating movements. This is due to the novel arrangement of the novel manner of connecting and supporting the grapple arms, levers and fulcrum links.

This device, while very simple and quickly and easily operated, is highly efficient for the purposes had in view, to wit: for the repairing of tires where it is necessary to work on the inner surface of the casing.

What I claim is:

1. A device for opening tire casings comprising a vertically movable member supporting a platen, on which latter the tire casing is adapted to rest, a pair of levers pivotally connected to said vertical member at their outer ends, grapple arms pivoted to the outer ends of said levers, and fulcrum links pivotally anchored at their lower ends and at their upper ends pivotally connected to the intermediate portions of said levers.

2. A device for opening tire casings comprising a vertically movable member supporting a platen, on which latter the tire casing is adapted to rest, a pair of levers pivotally connected to said vertical member at their outer ends, grapple arms pivoted to the outer ends of said levers, and fulcrum links pivotally anchored at their lower ends and at their upper ends pivotally connected to the intermediate portions of said levers, the pivotal connections between said links and levers being adjustable longitudinally of said links.

3. A device for opening tire casings comprising a vertically movable member supporting a platen, on which latter the tire casing is adapted to rest, a pair of levers pivotally connected to said vertical member at their outer ends, grapple arms pivoted to the outer ends of said levers, and fulcrum links pivotally anchored at their lower ends and at their upper ends pivotally connected to the intermediate portions of said levers, the pivotal connections between said levers and grapple arms being adjustable longitudinally of said arms to vary the normal spread of the latter.

4. In a device of the kind described, the combination with a cylinder and a piston working therein, of a platen carried by the upper end of said piston and on which a tire casing is adapted to rest, a pair of opposite links pivotally connected to said piston at their inner ends, hook-ended grapple arms arranged in opposite pairs with their ends pivotally connected to the outer ends of the respective levers, and fulcrum links pivotally anchored at their lower ends to the base of said cylinder and at their upper ends pivotally connected to the intermediate portions of the respective levers.

5. A device for opening tire casings comprising a vertically movable member supporting a platen, on which latter the tire casing is adapted to rest, a pair of levers pivotally connected to said vertical member at their outer ends, grapple arms pivoted to the outer ends of said levers, and fulcrum links pivotally anchored at their lower ends and at their upper ends pivotally connected to the intermediate portions of said levers, said platen being convexly curved reversely to the circumferential curve of the tire placed thereon.

6. A device for opening tire casings comprising a vertically movable member supporting a platen, on which latter the tire casing is adapted to rest, a pair of levers pivotally connected to said vertical member at their outer ends, grapple arms pivoted to the outer ends of said levers, and fulcrum links pivotally anchored at their lower ends and at their upper ends pivotally connected to the intermediate portions of said levers, said platen being readily detachable from said vertical moving member.

7. In a device of the kind described, the combination with a cylinder and a piston working therein, of a platen carried by the upper end of said piston and on which a tire casing is adapted to rest, a pair of opposite links pivotally connected to said piston at their inner ends, hook-ended grapple arms arranged in opposite pairs with their ends pivotally connected to the outer ends of the respective levers, and fulcrum links pivotally anchored at their lower ends to the base of said cylinder and at their upper ends pivotally connected to the intermediate portions of the respective levers, said platen being convexly curved in a direction reverse to the circumferential curve of a tire placed thereon.

In testimony whereof I affix my signature.

OLAF SUNDBY.